Patented Jan. 15, 1935

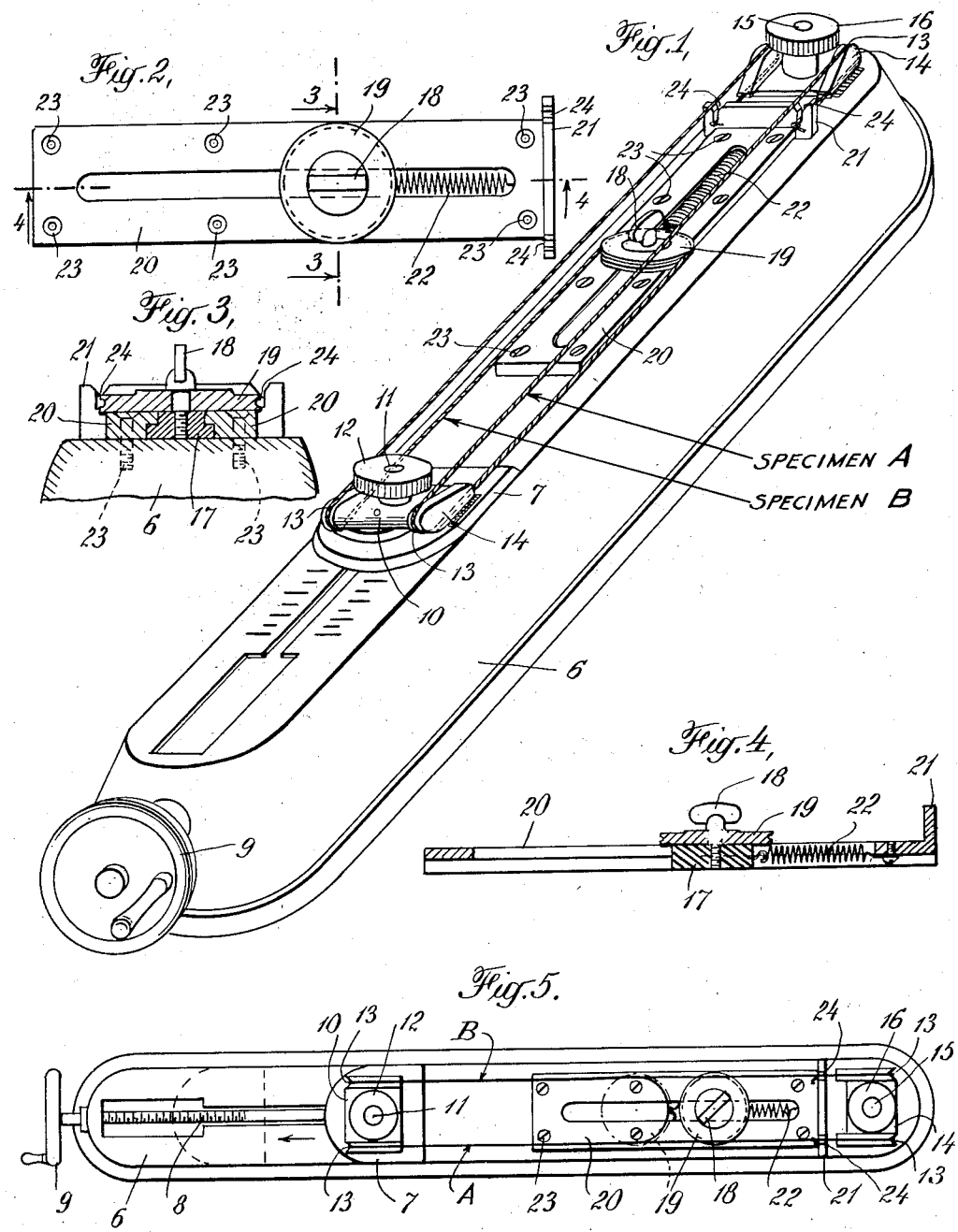

1,987,787

UNITED STATES PATENT OFFICE 1,987,787

TENSION TESTING DEVICE

Thomas S. Miller, Rome, N. Y.

Application October 14, 1933, Serial No. 693,584

8 Claims. (Cl. 73—51)

This invention relates to tension testing machines and has for its object improvements in apparatus for conducting comparative tests of long flexible bodies to determine which has the greater tensile strength. More specifically, the invention contemplates improvement in the art of determining the relative tensile strength of cords, strings, threads and similar bodies.

In the heretofore customary art of testing cords and similar long flexible bodies, comparisons of two or more such bodies have frequently been made by subjecting the bodies simultaneously to tension by means of a mechanism to which both cords are attached. One of the apparatus used in the prior art for making such comparative tests comprises a long base with a stationary clamp disposed at one extremity and a movable clamp located near the other end. The movable clamp is threaded to receive a screw which passes longitudinally within the base and is actuated by a crank at its outside end. By turning the crank, the movable clamp may be moved backward and forward in a slot in the base.

In the operation of such a device, according to the prior art, a pair of cords to be tested are fastened in the fixed clamp by one end, the other end of the cords being passed through the movable clamp which has been placed at an intermediate point on the major axis of the base. The cords are then drawn taut and fastened in the movable clamp. Prior to clamping an effort is made to stretch the cords equally, in order to have the initial tension in both cords equal. The heretofore customary practice in this respect is to pull the cords by hand. The operator attempts to judge relative tension from the appearance of the cords and the feeling in his hand. After the cord is clamped in the movable member, it is customary to test the relative tension in the cords by placing a pencil or other light object across them, attempting to determine by the relative sag whether or not the initial tension of both cords is the same. Having made such tests and such readjustments of the cords as in his judgment appear necessary, the operator then proceeds to turn the crank to increase the distance between the clamps until one or both cords are broken. The order in which the cords are broken is taken as an index of their comparative tensile strengths.

Unfortunately, such a method and apparatus are not always productive of true results, due to the fact that the means employed to obtain equal initial tension in the cords are inadequate for the purpose. Particularly in the hands of unskilled operators, a machine such as has been described is frequently productive of erroneous results. If the initial tension in both cords is not equal, the cord which is actually stronger may break first. In practice, it has been found substantially impossible to produce equal initial tension in the cords by the means now employed, because of the large element of human operative skill which enters. Since the probability of error is directly proportional to the influence of the human element in tests of this kind, it is apparent that results may be entirely vitiated by lack of skill.

It is the purpose of the present invention to eliminate, in large measure, the element of operative skill from tests of this character by providing positive mechanical means whereby equal initial tension in both cords is assured. This may be accomplished in a device of the character above described by tying the cords together at one end, and placing the knot in the groove of a pulley attached to a spring and associated with the testing device. The cords are then passed through one of the loosened clamps and fastened in the other. Tension is then placed upon the two cords by turning the crank, and when they are taut the other clamp is tightened. The test is then conducted in the manner previously known in the prior art. It will be seen that equal initial tension in both cords is assured by the fact that their point of jointure is free to move around the pulley until an equilibrium condition is attained. The presence of the spring, while not essential to the obtaining of equilibrium conditions in any one test, is useful in that it prevents excessive initial tension and assures the same initial tension in a series of comparative tests.

The invention undoubtedly will be better understood in the light of the following description taken in conjunction with the accompanying drawing, in which:

Fig. 1 is a perspective view of a tension testing apparatus in which is incorporated a tension equalizing device illustrative of this invention;

Fig. 2 is a plan view of a presently preferred form of a tension equalizing device of my invention;

Fig. 3 is a section taken along the line 3—3 of Fig. 2;

Fig. 4 is a section taken along the line 4—4 of Fig. 2; and

Fig. 5 is a plan view of the apparatus of Fig. 1.

Referring now to the drawing, it will be seen that the complete apparatus as shown in Fig. 1 comprises a frame or base 6, upon the substantially horizontal upper face of which is mounted a slider 7, slidable in a groove of the base 6 and actuated by a screw 8. This screw extends longitudinally within the base and is threaded into the slider at its inner end and attached to a crank 9 at its outer end. Turning the crank serves to move the slider back and forth in the groove in the base. A clamp comprising a wedge-shaped member 10, a bolt 11 and a nut 12, is mounted on the upper face of the slider. The apex of the wedge-shaped member faces toward the center of the machine. The lower face of the wedge and the upper face of the slider are roughened to provide a high coefficient of friction against the movement of a cord when it is clamped in place. The back of the wedge is rounded and provided with two grooves 13 for the reception of the cords. A stationary clamp comprising a second wedge-shaped member 14, a bolt 15 and a nut 16, is mounted on the upper surface of the base on the end opposite the slider. Members 14, 15 and 16 are similar in design to the corresponding members of the clamp mounted on the slider i. e., 10, 11 and 12. The apex of the second wedge faces toward the apex of the first wedge. By tightening the nuts 12 and 16, the two wedges may be clamped against the surfaces of the slider and the frame respectively.

A tension equalizing device is provided as shown. It is located on the upper surface of the base between the two clamps. A plate 20 is mounted on the base and held in place by countersunk screws 23. The plate 20 is slotted longitudinally for the reception of a sliding member 17 and a spring 22. The lower portion of the slot in the plate is preferably wider than the top portion in order that vertical movement of the sliding member may be eliminated. The spring is located in the portion of the slot nearest the stationary clamp and is preferably of the type designed for use under tension rather than compression. One end of the spring is fastened to the end of the slot and the other end is attached to the sliding member 17. A grooved pulley 19 is disposed in a horizontal position on top of the slider on the major axis of the machine and is held in place by means of a wing bolt 18. At the end of the plate which is nearest the stationary clamp a guide 21 is located. This guide is provided with grooves 24 for the passage of cords or similar bodies to be tested, the distance between the center lines of the grooves corresponding to the diameter of the pulley 19 and also to the distance between the grooves 13 on the rounded portions of wedges 10 and 14, so that the bodies placed in the apparatus will be held parallel to each other. The width of the grooves in the guide preferably corresponds to the diameter of the cord to be tested so that the grooves will serve to hold a knotted cord.

In conducting tests for tensile strength with an apparatus in which the improvements of my invention are incorporated, two test specimens A and B of suitable and approximately equal length are tied together at one end. The loose ends of the specimens are knotted to provide obstructions which will prevent the cords passing through the grooves of the guide. The slider 7 is moved toward the middle of the frame by turning the crank. The point at which specimens A and B are joined is placed in the groove of the pulley opposite the movable clamp and the cords are passed underneath the loosened wedge 10, through the grooves 13 on its rounded surface and carried over the top of the tension equalizing device to the stationary clamp. The cords are then placed in the grooves on the rounded face of wedge 14, carried underneath the wedge and placed in the grooves provided in the guide. The knots on the ends of cord specimens A and B will prevent them from being drawn back through the guide when the cords are pulled.

The specimens A and B having thus been placed in their respective positions for the purpose of testing, the crank is turned to move the slider 7 toward its end of the frame, thus increasing the distance between two clamps and tightening the specimens. In this manner, the spring is placed under tension. Equal initial tension in both specimens A and B is assured by the fact that their common ends joined by the knot will move around on the pulley until an equilibrium condition is obtained. The pulley is preferably of the revolving type, but if the groove is made smooth, it may be fixed, since the knot will slip around the periphery until a substantial condition of equilibrium is obtained. By constructing the pulley so that the groove is smooth and the pulley itself revolves easily, proper equilibrium conditions are doubly assured. Since the diameter of the pulley is equal to the distance between grooves on the wedge shaped members 14 and also equal to the distance between grooves in the guide 21, there is increased assurance of the parallel position of the bodies to be tested and consequent accuracy of results.

The specimens having been placed under equal initial tension the two clamps are tightened. The looped specimens A and B are freed from the pulley and the crank is turned to increase the distance between the clamps until one or both of the cords are strained to the breaking point. If the base adjacent the slidable member is marked into graduations, these will serve to indicate relative strains required to break the two cords.

The invention is particularly applicable for rapid testing of cords or other long flexible bodies in conjunction with sales demonstrations and the like. The provision of means for equalizing initial tensile stress in the test specimens permits accurate results to be obtained even when the machine is operated by unskilled labor.

Variations from the apparatus may be made, without, however, departing from the fundamental concepts of this invention. For example, the spring 22, if made suitable for acting under compression, will permit the operation of the apparatus by looping the cord over the side of the pulley nearest the slidable member 7, the two cords being passed through the grooves of guide 21, under and over wedge 14 to clamp 10, 11, 12 and clamped therein in the usual manner. Initial tension may then be placed on the cords before clamp 14, 15, 16 is tightened, and equilibrium will thus be assured. This method of operation has an additional advantage in that it is not necessary to remove the looped cords from the pulley prior to the breaking tests. As has been pointed out, the spring, either in tension or compression, is not essential for assuring equal initial tension in any one test, but its use is preferable because equal initial tension from one test to another of a series is thus made possible.

It will be apparent that the apparatus would be operable if the tension equalizing device of my invention were placed on the base outside of the space between the two clamps. However, the location of the equalizing device near the center of the major axis of the base is preferable, since in this way excessive length of the base is avoided.

The guide 21, while not essential for the equalizing of initial tension in tests of this character, has been found to be of considerable assistance in speeding up the operation and in assuring a proper placement of specimens A and B in the clamp 14, 15, 16.

I claim:

1. Apparatus for determining the comparative tensile strength of two long flexible bodies which comprises a base on one end of which is mounted a clamp, a slider which is movable along the major axis of the base, a second clamp mounted on said slider, means for moving said slider, a pulley disposed upon the base, in approximate alignment with the clamps, said pulley being adapted to equalize the initial tension in said bodies prior to the determination of comparative tensile strength of said bodies.

2. Apparatus according to claim 1 in which said pulley is movable along the major axis of the base and in which a spring connects said pulley with said base.

3. Apparatus according to claim 1 in which the pulley is located at a point between the two clamps.

4. Apparatus according to claim 1 in which a guide is mounted on the base near the first clamp, said guide being adapted to receive and retain the loose ends of the bodies to be tested.

5. Apparatus for determining the comparative tensile strength of two long flexible bodies which comprises, a base on one end of which is associated a clamp with grooves adapted for the spacing of said bodies, a slider which is movable along the major axis of the base, a second clamp mounted on said slider, said second clamp also being provided with grooves for spacing said bodies, a grooved pulley located above said base in approximate alignment with the clamps, and a guide mounted on said base and grooved for the retention of loose ends of the knotted bodies.

6. Apparatus according to claim 5 in which the distances from center to center of the grooves in said guide are equal to the diameter of the pulley and also equal to the distance from center to center of the grooves in the respective clamps.

7. Apparatus for determining the comparative tensile strength of two long flexible bodies which comprises a base on one end of which is mounted a clamp, a slider which is movable along the major axis of said base, a second clamp mounted on the slider, means for moving said slider, a sliding member movable along the major axis of said base, a spring connecting said sliding member with said base and a pulley mounted on said second slider.

8. Apparatus for determining the comparative strength of two long flexible bodies which comprises a base, a grooved clamp mounted on one end of the base, a slider which is movable along the major axis of said base, means for moving said slider, a second grooved clamp mounted on said slider, and a grooved pulley mounted on said base in approximate alignment with the clamps, the diameter of the pulley being substantially equal to the distance between the grooves on said clamps.

THOMAS S. MILLER.